United States Patent
Baldasarre et al.

(10) Patent No.: US 9,513,310 B2
(45) Date of Patent: Dec. 6, 2016

(54) HIGH-SENSITIVITY, Z-AXIS MICRO-ELECTRO-MECHANICAL DETECTION STRUCTURE, IN PARTICULAR FOR AN MEMS ACCELEROMETER

(71) Applicant: STMicroelectronics S.r.l., Agrate Brianza (IT)

(72) Inventors: Leonardo Baldasarre, Alkmaar (NL); Alessandro Tocchio, Gessate (IT); Sarah Zerbini, Fontanellato (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 305 days.

(21) Appl. No.: 14/220,979

(22) Filed: Mar. 20, 2014

(65) Prior Publication Data
US 2014/0283605 A1   Sep. 25, 2014

(30) Foreign Application Priority Data
Mar. 22, 2013  (IT) .............................. TO2013A0237

(51) Int. Cl.
*G01P 15/125*  (2006.01)
*G01P 15/08*  (2006.01)

(52) U.S. Cl.
CPC ..... *G01P 15/125* (2013.01); *G01P 2015/0831* (2013.01); *G01P 2015/0837* (2013.01)

(58) Field of Classification Search
CPC ......... G01P 15/125; G01P 15/18; G01P 15/08; G01P 15/0802; G01P 15/131
USPC ............................. 73/514.32, 514.38, 514.36
See application file for complete search history.

(56) References Cited

U.S. PATENT DOCUMENTS

| | | | |
|---|---|---|---|
| 7,121,141 B2 | 10/2006 | McNeil | |
| 2004/0025591 A1* | 2/2004 | Yoshikawa | ............. G01P 15/18 |
| | | | 73/514.32 |
| 2004/0079154 A1* | 4/2004 | Yoshikawa | ........... G01P 15/125 |
| | | | 73/514.32 |
| 2010/0122579 A1* | 5/2010 | Hsu | ....................... G01P 15/125 |
| | | | 73/514.32 |

(Continued)

FOREIGN PATENT DOCUMENTS

| | | |
|---|---|---|
| EP | 2 315 039 A1 | 4/2011 |
| EP | 2 439 542 A1 | 4/2012 |
| EP | 2 479 579 A1 | 7/2012 |

*Primary Examiner* — Helen Kwok
(74) *Attorney, Agent, or Firm* — Seed Intellectual Property Law Group LLP (57) ABSTRACT

A z-axis micro-electro-mechanical detection structure, having a substrate defining a plane and a suspended mass carried by two anchorage elements. The suspended mass includes a translating mass, suspended over the substrate, mobile in a transverse direction to the plane and arranged between the anchorage elements and two tilting masses, each of which is supported by the anchorage elements through respective elastic anchorage elements so as to be able to rotate with respect to respective oscillation axes. The oscillation axes are parallel to each other to enable a translation movement of the translating mass. Fixed electrodes face at a distance the tilting masses or the translating mass so as to be able to detect displacement of the suspended mass as a result of external forces. Elastic supporting elements are arranged between the translating mass and the tilting masses to enable relative rotation between the translating mass and the tilting masses.

22 Claims, 5 Drawing Sheets

(56) References Cited

U.S. PATENT DOCUMENTS

| | | | |
|---|---|---|---|
| 2011/0023604 A1 | 2/2011 | Cazzaniga et al. | |
| 2011/0023606 A1* | 2/2011 | Burghardt | G01P 15/125 |
| | | | 73/514.32 |
| 2011/0291644 A1* | 12/2011 | Kanemoto | G01P 15/0802 |
| | | | 324/162 |
| 2012/0025333 A1* | 2/2012 | Yoshida | B81C 1/00587 |
| | | | 257/415 |
| 2012/0104520 A1* | 5/2012 | Uto | B81B 3/0051 |
| | | | 257/417 |
| 2013/0125649 A1* | 5/2013 | Simoni | G01P 15/18 |
| | | | 73/504.04 |
| 2014/0069190 A1* | 3/2014 | Tanaka | G01P 15/125 |
| | | | 73/514.32 |
| 2014/0090469 A1* | 4/2014 | Comi | G01P 15/097 |
| | | | 73/504.12 |
| 2014/0096587 A1* | 4/2014 | Stewart | G01P 15/125 |
| | | | 73/1.38 |
| 2014/0137670 A1* | 5/2014 | Hata | G01L 1/144 |
| | | | 73/862.621 |
| 2014/0174183 A1* | 6/2014 | Comi | G01P 15/0975 |
| | | | 73/514.38 |
| 2014/0208823 A1* | 7/2014 | Trusov | G01P 21/00 |
| | | | 73/1.38 |
| 2014/0361348 A1* | 12/2014 | Yoneoka | G01C 19/5762 |
| | | | 257/254 |
| 2015/0029690 A1* | 1/2015 | Tanaka | G01P 15/125 |
| | | | 361/777 |
| 2015/0260752 A1* | 9/2015 | Kishimoto | G01P 15/125 |
| | | | 73/514.32 |

\* cited by examiner

HIGH-SENSITIVITY, Z-AXIS MICRO-ELECTRO-MECHANICAL DETECTION STRUCTURE, IN PARTICULAR FOR AN MEMS ACCELEROMETER

BACKGROUND

Technical Field

The present disclosure relates to a high-sensitivity, z-axis micro-electro-mechanical detection structure; in particular for a z-axis MEMS (micro-electro-mechanical system) structure.

Description of the Related Art

Z-axis inertial accelerometers of an MEMS type are known in the art and include micro-electro-mechanical structures sensitive to accelerations acting in a direction orthogonal to a main plane and to the top surface of a corresponding substrate (in addition, it is possible to detect further accelerations acting in the same plane).

Figure 1A:
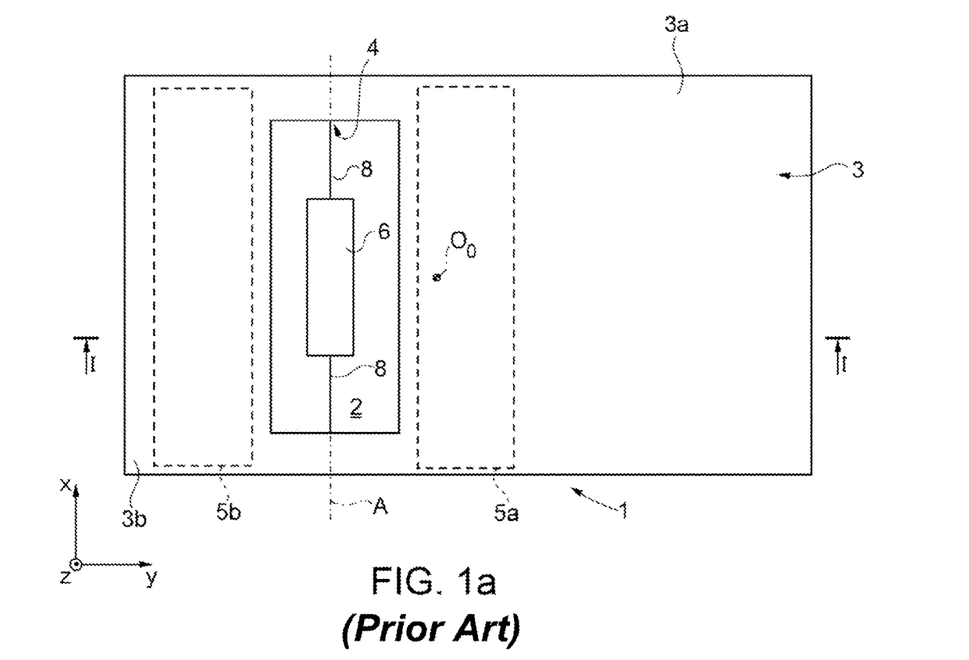
FIG. 1a is a top plan view of an MEMS structure of a z-axis sensor of a known type.
Figure 1B:
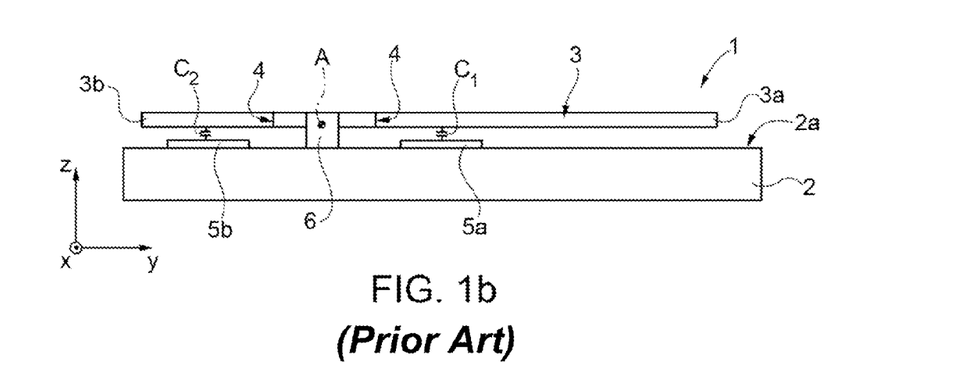

FIGS. 1a and 1b show, for example, an MEMS structure of a known type, designated as a whole by reference number 1, belonging to a z-axis inertial structure (which further comprises an electronic read interface, not illustrated, electrically coupled to the above MEMS structure).

The MEMS structure 1 comprises a substrate 2 (for example, of semiconductor material, in particular silicon), having a top surface 2a, and a detection mass 3, of conductive material, for example polycrystalline or monocrystalline silicon, and arranged on top of the substrate 2, suspended at a certain distance from the top surface 2a thereof. The top surface 2a of the substrate 2 defines a plane xy in a cartesian reference system xyz having a first axis x, a second axis y, and a third axis z. The detection mass 3 has a main extension in a plane that, in the rest condition and in the absence of external accelerations or stresses, is acting on the MEMS structure 1, and is substantially parallel to the top surface 2a of the substrate 2, and has a substantially negligible dimension along the third axis z.

The detection mass 3 has a through opening 4 throughout its thickness that has, in top plan view, a substantially rectangular shape elongated parallel to the first axis x, and is arranged at a certain distance from the centroid (or center of gravity) of the detection mass 3. The through opening 4 consequently divides the detection mass 3 into a first portion 3a and a second portion 3b, arranged on opposite sides with respect to the through opening along the second axis y.

The first portion 3a has a larger dimension along the second axis y than the second portion 3b.

The MEMS structure 1 further comprises a first fixed electrode 5a and a second fixed electrode 5b, of conductive material, for example a metal such as aluminum, arranged on the top surface 2a of the substrate 2, on opposite sides with respect to the through opening 4 along the second axis y. In this way, the first and second fixed electrodes 5a, 5b are positioned, respectively, underneath the first and second portions 3a, 3b of the detection mass 3. The fixed electrodes 5a, 5b have, in a plane parallel to the plane xy, a substantially rectangular shape, elongated along the first direction x and thus define, together with the detection mass 3, a first a second sensing capacitors with plane and parallel faces, designated as a whole by $C_1$, $C_2$ in FIG. 1b, each having a respective rest capacitance.

The detection mass 3 is anchored to the substrate 2 through a central anchorage element 6, formed by a pillar element extending into the through opening 4 from the top surface 2a of the substrate 2, centrally with respect thereto.

The central anchorage element 6 is consequently arranged at the same distance from each of the fixed electrodes 5a, 5b along the second axis y.

In particular, the detection mass 3 is mechanically connected to the central anchorage element 6 through two elastic anchorage elements 8, which extend into the through opening 4, with a substantially rectilinear extension, aligned with each other along a rotation axis A parallel to the first axis x. The elastic connection elements 8 are arranged on opposite sides of the central anchorage element 6, between the latter and the detection mass 3, and are configured to be compliant to torsion about their extension direction, thus enabling rotation of the detection mass 3 out of the plane xy, about the rotation axis A.

In use, in response to an acceleration acting in the orthogonal direction z, the detection mass 3, due to its eccentricity with respect to the rotation axis A, turns about the latter, by an inertial effect, in such a way that the first or second portion 3a, 3b approaches the respective fixed electrode 5a, 5b and the other portion 3b, 3a recedes from the other fixed electrode 5b, 5a, generating opposite capacitive variations of the detection capacitors $C_1$, $C_2$. An appropriate interface electronics (not illustrated in FIGS. 1a and 1b) of the structure, electrically coupled to the MEMS structure 1, receives the capacitive variations of the detection capacitors $C_1$, $C_2$, and processes them in a differential way for determining the value of the acceleration acting along the orthogonal axis z.

The MEMS structure 1 of FIGS. 1a and 1b, although advantageously enabling detection of accelerations acting along the orthogonal axis z, enables a limited scalability of the dimensions in the case a high sensitivity is specified, defined as variation in the rotation angle as a function of the variation in the external acceleration.

In fact, the reduction in dimensions of the known structure entails a reduction in the length of the arm (distance between the center of mass of the entire detection mass 3 and the rotation axis A) and thus a reduction in the moment of inertia.

BRIEF SUMMARY

One or more embodiments of the present disclosure provide an MEMS detection structure having high sensitivity. According to one embodiment of the present disclosure there is provided an MEMS detection structure that includes a substrate having a first surface in a plane and a first anchorage element and a second anchorage element projecting from and fixed with respect to the substrate. The structure further includes a translating mass suspended over the substrate and moveable in a first direction that is transverse to the plane. The structure includes elastic anchorage elements and first and second tilting masses. The first tiling mass is coupled to the first anchorage element by one or more of the elastic anchorage elements and the second tilting mass is coupled to the second anchorage element by one or more of the elastic anchorage elements. The first mass is configured to rotate with respect to a first axis and the second mass being configured to rotate with respect to a second axis. The first and second axes are substantially parallel to each other. The structure further includes fixed electrodes facing at a distance at least one of the first and second tilting masses and the translating mass and elastic supporting elements elastically coupling the translating mass to a respective one of the first and second tilting masses.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIG. 1b is a cross-sectional view of the MEMS structure of FIG. 1a, taken along line I-I of FIG. 1a;

FIG. 5 shows the plot of the sensitivity ratio between the structure of FIG. 3 and the known structure of FIG. 1a;

FIG. 7 shows a block diagram of an electronic device incorporating the MEMS structure of FIG. 2a; and FIG. 8 shows the block diagram of a different electronic device incorporating the MEMS structure of FIG. 2a.

DETAILED DESCRIPTION

Figure 2A:
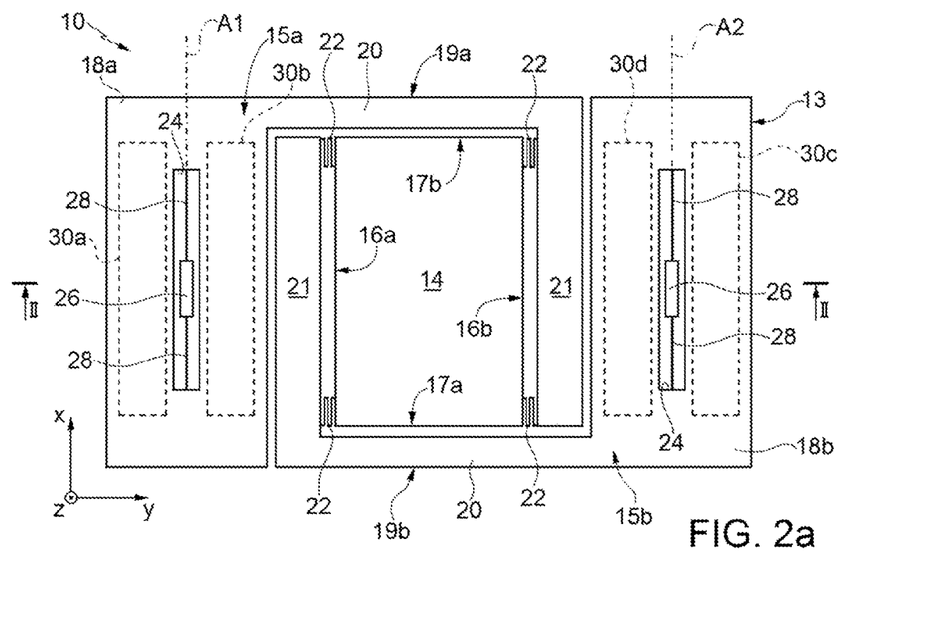
FIG. 2a is a top plan view of an embodiment of the present MEMS structure of a z-axis sensor.
Figures 2B, 2C:
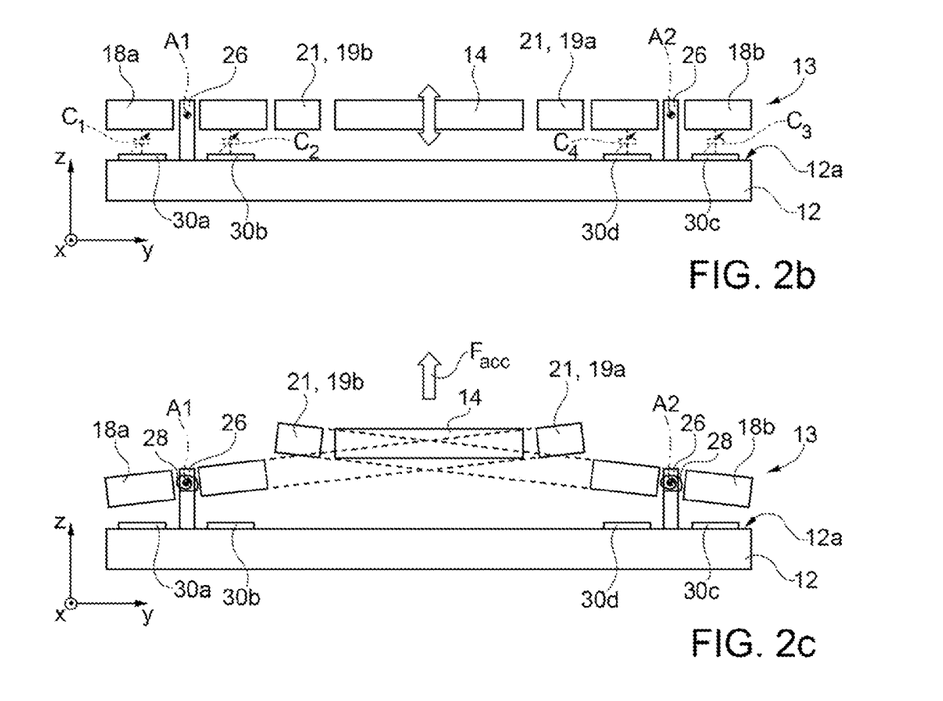
FIG. 2b is a cross-sectional view of the MEMS structure of FIG. 2 in the rest condition.
FIG. 2c is a cross-sectional view of the MEMS structure of FIG. 2 illustrating the displacement of the detection mass in response to an external acceleration.

FIGS. 2a-2c show an embodiment of a structure 10 sensitive to external forces acting in a direction perpendicular to a main extension plane of the structure 10.

As in the known structure 1 of FIGS. 1a, 1b, the structure 10 comprises a substrate 12 (for example, of semiconductor material, in particular silicon) having a top surface 12a, and a suspended mass 13 of conductive material, for example polycrystalline or monocrystalline silicon, suspended over the substrate 12, at a certain distance from the top surface 12a thereof.

The substrate 12 defines a triad of cartesian axes xyz, where a first axis x and a second axis y are defined by the top surface 12a of the substrate, and a third axis z, perpendicular to the axes x and y, is here defined by the height of the substrate 12.

The suspended mass 13 is formed by a translating mass 14, by two tilting masses 15a, 15b, and by corresponding elastic elements 22, 28.

The translating mass 14 here has a substantially rectangular parallelepipedal shape, having a main face substantially parallel to the top surface 12a of the substrate 12. Moreover, the translating mass 14 has a height, along the third axis z, much smaller than the other dimensions in the plane xy. For example, the translating mass 14 may have a height comprised between 20 and 30 µm, for example 24 µm, dimensions in the plane xy comprised between 300 µm and 1 mm, for example 400×800 µm.

In this embodiment, the translating mass 14 is thus delimited by two pairs of lateral surfaces (also referred to hereinafter as "sides") 16a, 16b and 17a, 17b, where the sides of each pair (for example 16a, 16b) are mutually parallel and perpendicular to the sides of the other pair (for example 17a, 17b). Hereinafter, for clarity of description, the sides 16a, 16b and 17a, 17b will also be referred to, respectively, as "first, second, third, and fourth sides".

The tilting masses 15a, 15b are mutually congruent and have a central symmetrical shape, since they can be obtained from each other by rotating them through 180° about a central axis (center of the translating mass 14). Moreover, each tilting mass 15a, 15b is formed by a supporting mass 18a, 18b and by a supporting arm 19a, 19b, which are monolithic and extend from the respective supporting mass 18a, 18b. Each tilting mass 15a, 15b has the same thickness as and is coplanar to the translating mass 14. The supporting arms 19a, 19b here extend for about approximately one half of the perimeter of the translating mass 14 and support it, in proximity of the edges thereof, through elastic supporting elements or springs 22.

In detail, in this embodiment, the supporting masses 18a, 18b have an elongated rectangular shape parallel to the first axis x and are arranged on opposite sides of the translating mass 14, at a distance from the first side 16a and, respectively, the second side 16b. Each supporting arm 19a, 19b is here substantially L-shaped and comprises a first portion 20 and a second portion 21, transverse, in particular perpendicular, with respect to each other. The first portion 20 of each supporting arm 19a, 19b extends perpendicularly from the long side of the respective supporting mass 18a, 18b, parallel to and along the third and fourth sides 17a, 17b, respectively, of the translating mass 14. In the example illustrated, thus, the first portions 20 extend parallel to the axis y. The second portion 21 of each supporting arm 19a, 19b extends parallel to the sides 16a, 16b, and precisely between the second side 16b and the second supporting mass 19b and, respectively, between the first side 16a and the first supporting mass 19a.

Thus, in the example illustrated, the second portions 21 extend parallel to the axis x.

The elastic elements or springs 22 extend in pairs between the translating mass 14 and the second portions 21 of the supporting arms 19a, 19b, for example each in the proximity of a respective edge of the translating mass 14. In one embodiment, the springs 22 may be provided in a recess of the translating mass 14, for example at the edges thereof. The springs 22 are configured for enabling a relative rotation between the translating mass 14 and the supporting arms 19a, 19b about axes parallel to the direction of the second portions 21 (and to the axis x), as explained in detail hereinafter.

In practice, the supporting arms 19a, 19b extend towards the other supporting mass 18b, 18a and about part of the periphery of the translating mass 14 so as to be able to support the translating mass 14 in points symmetrical with respect to, but remote from, the respective supporting masses 18a, 18b. Thereby, the distance between the centroid and the rotation axes is increased for each of the two structures 15a 15b, thus maximizing the equivalent arm of the entire structure, as explained below.

Furthermore, each supporting mass 18a, 18b has a respective through opening 24, which extends throughout its thickness and has, in top plan view, a substantially rectangular shape extending principally along the first axis x in a position substantially centered with respect to the corresponding supporting mass 18a, 18b.

Each supporting mass 18a, 18b is moreover anchored to the substrate 12 by a respective anchorage element 26 and pairs of elastic anchorage elements 28.

Each anchorage element 26 is formed by a pillar extending vertically (in the direction of the axis z) within the respective through opening 24 from the top surface 12a of the substrate 12 and centrally with respect to the respective through opening 24.

Each of the pairs of elastic anchorage elements 28 extends into the respective through openings 24 and connects the supporting masses 18a, 18b to the respective anchorage element 26. In detail, the two elastic anchorage elements 28 of each supporting mass 18a, 18b are arranged on two opposite sides of the respective anchorage element 26 and are aligned with each other in a direction parallel to the first axis x. Furthermore, they are configured to be compliant to torsion so that the respective axis of alignment forms a rotation axis A1, A2 for the respective tilting mass 15a, 15b.

The structure 10 further comprises two pairs of fixed electrodes 30a, 30b, 30c, 30d of conductive material, for example aluminum, doped polysilicon, etc., arranged on the top surface 12a of the substrate 12. In detail, the first pair of fixed electrodes 30a, 30b extends underneath a first supporting mass, here the supporting mass 18a, on opposite sides with respect to the respective through opening 24, and the second pair of fixed electrodes 30c, 30d extends underneath the other supporting mass 18b, on opposite sides with respect to the respective through opening 24.

The fixed electrodes 30a, 30b, 30c, 30d have a substantially rectangular shape, elongated in the first direction x, and define, together with the respective supporting masses 18a, 18b, two pairs of detection capacitors with plane and parallel faces, designated as a whole by C1-C2 and C3-C4 for the tilting mass 15a and for the tilting mass 15b, respectively. Each anchorage element 26 is consequently arranged at the same distance from the fixed electrodes 30a, 30b, 30c, 30d along the second axis y.

The structure 10 is obtained according to standard MEMS manufacturing techniques, comprising forming the electrodes 30a-30d on top of the substrate 12; forming a sacrificial layer; forming openings in the sacrificial layer; growing a polycrystalline layer that forms the anchorage elements in the openings and a structural layer on top of the sacrificial layer; defining the structural layer, to form the suspended mass 13; and removing the sacrificial layer in order to release the translating mass, the tilting masses 15a, 15b, and the corresponding elastic elements.

In this way, in the embodiment illustrated, the translating mass 14 and the tilting masses 15a, 15b are made of the same material, are coplanar (in the rest condition), and have the same height (in the direction z). Alternatively, it is possible to provide a structure in which the height of the tilting masses 15a, 15b and that of the translating mass 14 is different.

In use, in the rest condition, i.e., in absence of external forces (FIG. 2b), the translating mass 14 and the tilting masses 15a, 15b are coplanar. In the presence of an external acceleration (FIG. 2c), owing to the symmetry of the system and the dual system of elastic elements 22, 28, the translating mass 14 moves in a transverse direction, in particular perpendicular, with respect to the plane xy, while the tilting masses 15a, 15b rotate about the respective oscillation axes A1, A2. In particular, the tilting masses 15a, 15b rotate in opposite directions (one in a clockwise direction, the other in a counterclockwise direction), as illustrated, for example, in FIG. 2c, wherein a force causes displacement of the translating mass 14 in recession from the substrate 12.

Rotation of the tilting masses 15a, 15b thus causes each supporting mass 18a, 18b to move away from one of the respective fixed electrodes (here the fixed electrodes 30b, 30d) and each supporting mass 18a, 18b to approach the other respective fixed electrode (here the fixed electrodes 30a, 30c), with an equal and opposite variation in the capacitance C1-C3 and C2-C4.

For each tilting mass 15a, 15b, by measuring the capacitance variation between the capacitors of each pair C1-C2 and C3-C4 it is possible to measure the external acceleration $$\Delta C = (C2+C4)-(C1+C3) \propto Facc$$

In a different embodiment, where the pairs of electrodes 30a and 30c, 30b and 30d are short-circuited to each other, the following relation applies:

$$\Delta C = (C2-C1) = (C4-C3) \propto Facc$$

so that the measured capacitance difference is in any case proportional to the force acting on the translating mass 14. In particular, by virtue of the symmetry of the structure 10, the rotation angles of the two tilting masses 15a, 15b are equal in value, but opposite, giving rise to a double-rotating structure.

Figure 3:
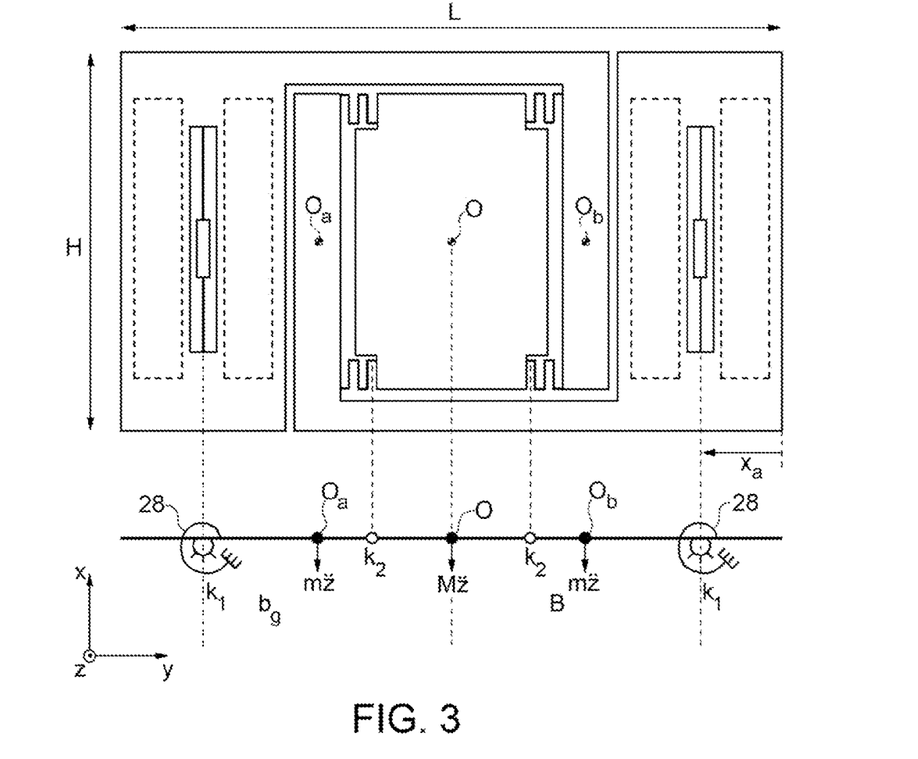
FIG. 3 shows the structure of FIGS. 2a-2c and the corresponding mechanical equivalent, together with physical quantities that describe the behavior of the structure in response to an external force.

For calculating the sensitivity of the structure, the model of the structure 10 illustrated in FIG. 3 is used, where O is the center of gravity (or center of mass) of the system, and Oa, Ob are the centers of gravity (or centers of mass) of the tilting masses 15a, 15b. FIG. 3 shows physical quantities regarding the structure 10, which are useful for calculating the sensitivity thereof and have the following meanings:

L is the total length of the structure in direction x;
H is the height of the structure in direction y;
t is the height of the structure in direction z;
m is the mass of each tilting mass 15a, 15b;
M is the mass of the translating mass 14;
θ is the rotation angle of each tilting mass 15a, 15b;
$k_1$, $k_2$ are the torsional stiffnesses of the elastic anchorage elements 28 and of the springs 22, respectively;
$r_1$, $r_2$ are dissipative terms;
$b_g$ is the arm of each tilting mass 15a, 15 (distance between the corresponding center of gravity Oa, Ob and the corresponding oscillation axis A1, A2);
B is the arm of the translating mass 14 (distance between the corresponding center of gravity O and the oscillation axes A1, A2);
J is the moment of inertia of each tilting mass 15a, 15b; and
$x_a$ is the distance of each oscillation axis A1, A2 from the external edge of each tilting mass 15a, 15b.

The equation of motion that describes the mechanical system of FIG. 3 can be written as $$[2J+MB^2]\ddot{\theta}+2(r_1+r_2)\dot{\theta}+(k_1+k_2)\theta = -(2mb_g+MB)a$$

where a is the external acceleration.

For simplicity, in the calculation of the sensitivity, the mass of the supporting arms 15a, 15b will be neglected. This assumption entails the zeroing of the arm $b_g$ of the two tilting masses ($b_g=0$) in the previous equation and leads to an underestimate of the sensitivity of the structure so that the validity of the model is not jeopardized.

The sensitivity of the structure 10 can be expressed as variation in the oscillation angle θ with respect to the variation in the external acceleration a $$\begin{cases} \dfrac{d\theta}{da} = \left( \dfrac{mb_G + \dfrac{M}{2}B}{k_1+k_2} \right) \\ k_1+k_2 = (2\pi f)^2 \left[ J + \dfrac{M}{2}B^2 \right] \end{cases}$$

where f is the resonance frequency of the mode excited by the external force a, and the indicated quantities are functions of the dimensions of the structure as indicated below:

$$m = 2 \cdot \rho \cdot x_a \cdot H \cdot t$$

$$J = \frac{1}{12} \rho \cdot H \cdot t \cdot (2x_a)^3$$

$$M = \rho \cdot H \cdot t \cdot (L - 4x_a)$$

$$B = \frac{1}{2}(L - 3x_a)$$

$$\omega = 2\pi f$$

where ρ is the specific mass of the structure (in the case considered, of the silicon).

If we define $$x_a = \alpha L$$

with 0<α<0.5
the sensitivity of the structure 10 can be written as $$\left.\frac{d\theta}{da}\right|_{DT} = \frac{(1-4\alpha)(1-3\alpha)}{\omega^2 L \left[\frac{2}{3}\alpha^3 + \frac{1}{2}(1-4\alpha)(1-3\alpha)^2\right]}$$

Figure 4:
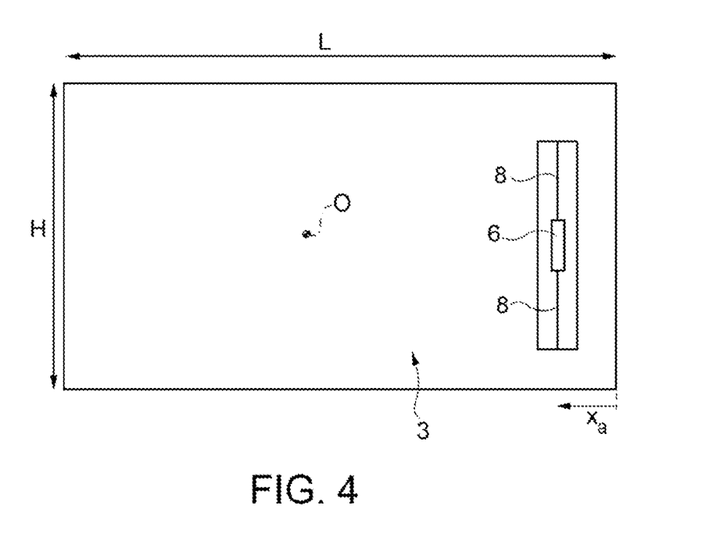
FIG. 4 is a top plan view of the MEMS structure of FIG. 1, highlighting physical quantities thereof, for a comparison of sensitivity with the structure of FIG. 3.

Instead, for the structure 1 of FIGS. 1a, 1b (see also FIG. 4, showing the corresponding geometrical parameters), having the same length L and height H, and with axis A arranged at an equal distance $x_a$ from the closest outer edge of the detection mass 3, we obtain $$\begin{cases} \left.\frac{d\theta_0}{da}\right|_{STD} = \frac{m_0 b_{G0}}{k_0} \\ k_0 = (2\pi f_0)^2 \cdot J_0 \end{cases}$$

$$\left.\frac{d\theta_0}{da}\right|_{STD} = \frac{3(1-2\alpha)}{2\omega_0^2 L(3\alpha^2 - 3\alpha + 1)}$$

where the quantities have the same meaning as above, and the index 0 and the indicated quantities are functions of the dimensions of the structure of FIG. 4 as given below $$m_0 = \rho L H t$$

$$J_0 = \frac{1}{12}\rho H L^3 t + m_0 \left(\frac{L}{2} - x_a\right)^3$$

$$b_{g0} = \frac{L}{2} - x_a$$

$$x_a = \alpha L$$

To compare the sensitivity of the present structure 10 with that of the known structure 1, the sensitivity calculated above is to be multiplied by 2, taking into account that there are two tilting masses 15a, 15b.

In fact, the translating mass is inertial and does not contribute directly to the detection, because it does not have an underlying electrode and the detection is made by the tilting masses 15a, 15b, each having a pair of underlying fixed electrodes 30a-30c: to supply the same signal as that of a single-mass structure it is sufficient for each pair to rotate through an angle equal to half of the rotation angle of the single mass. This loss of useful rotation is thus compensated in that the described structure has twice the number of sensing electrodes (the pairs of fixed electrodes [30a, 30c] and [30b, 30d]).

For the structure 10 described herein to present a better sensitivity than the known structure 1, the following relation has to be verified:

$$2 \cdot \left.\frac{d\theta}{da}\right|_{DT} > \left.\frac{d\theta_a}{da}\right|_{STD} \rightarrow \frac{2 \cdot \left.\frac{d\theta}{da}\right|_{DT}}{\left.\frac{d\theta_0}{da}\right|_{STD}} > 1 \quad (1)$$

Figure 5:
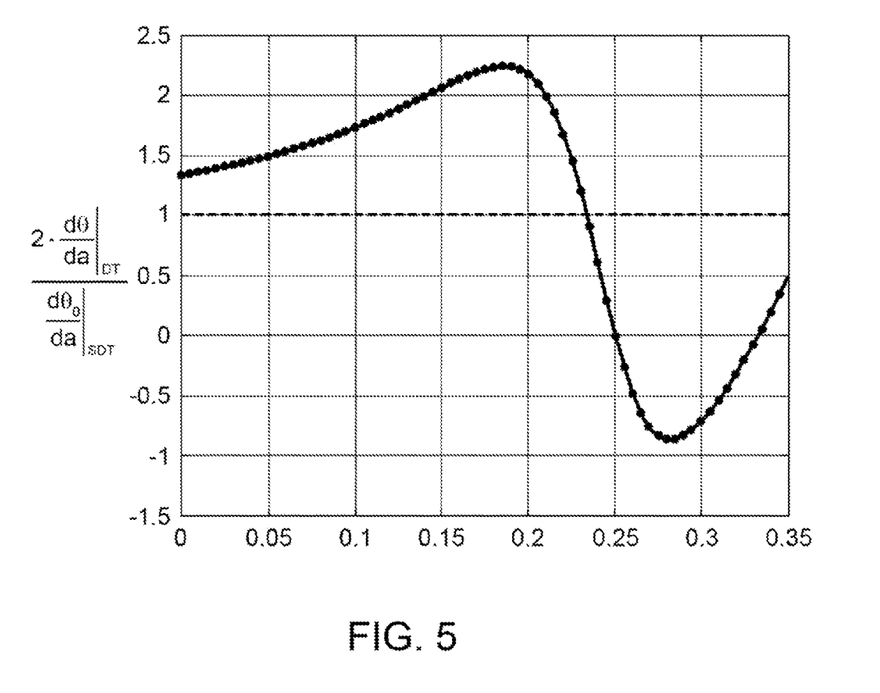

If the known structure 1 and the structure 10 described here are designed to have the same resonance frequencies f=$f_0$, and plotting Eq. (1) as a function of the parameter α, the plot of FIG. 5 is obtained, from which it may be noted that Eq. (1) is satisfied for values of α

0<α<0.23 and that for values comprised between 0.15 and 0.2 the sensitivity of the structure 10 described herein is more than twice the sensitivity of the known structure 1, for a same area.

Alternatively, with the structure 10 described herein, it is possible to achieve the same sensitivity with a smaller mass or, in other words, to reduce the dimensions of the structure 10 without loss of sensitivity. In addition, the structure 10 described herein enables variation of other parameters, for example the stiffness, without jeopardizing the sensitivity of the structure 10.

Furthermore, with the structure 10 described herein, it is possible, through an appropriate design of the translating mass 14, to act upon the damping coefficients of the structure independently from the sensitivity of the device. In particular, by modifying parameters such as the distance in the direction z between the translating mass and the substrate, providing or not through holes in the translating mass or using similar artifices, it is possible to regulate the dissipative term, without altering the performance of the device.

Figure 6:
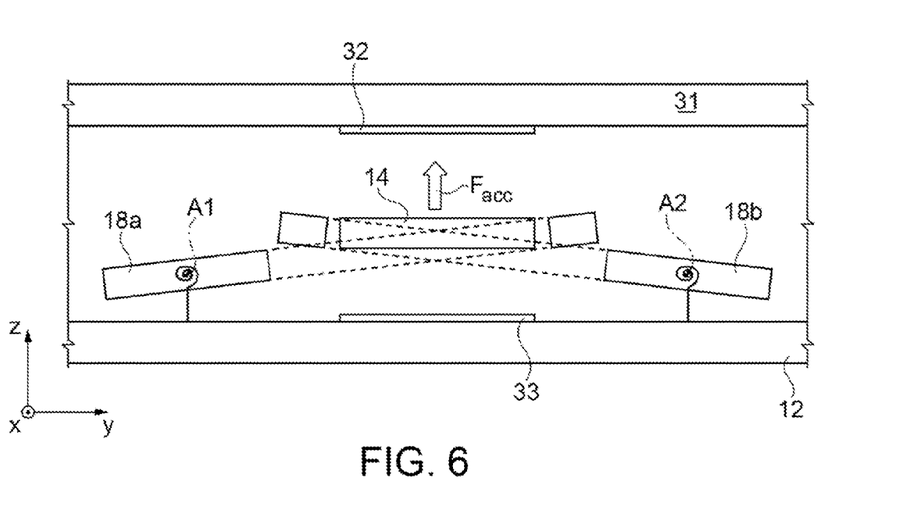
FIG. 6 is a cross-sectional view of a different embodiment of the present MEMS structure.

FIG. 6 shows a fully differential embodiment. In FIG. 6, a cap 31 is provided above and at a distance from the plane of the translating mass 14 and carries a first electrode 32. A second electrode 33 is arranged on top of the substrate 12, under the translating mass 14, vertically aligned to the first electrode 32. Moreover, no fixed electrodes 30a, 30b, 30c, 30d are present in the structure of FIG. 6.

Consequently, the structure of FIG. 6 has just two capacitors, formed by the translating mass 14 and each of the electrodes 32, 33. The movement of the translating mass 14 thus determines an increase of the capacitance of one of the two capacitors and a corresponding reduction in the capacitance of the other, enabling fully differential parallel-plate sensing.

The structure described herein may be advantageously integrated in motion-sensing modules provided in MEMS technology, which include gyroscopes and accelerometers.

Figure 7:
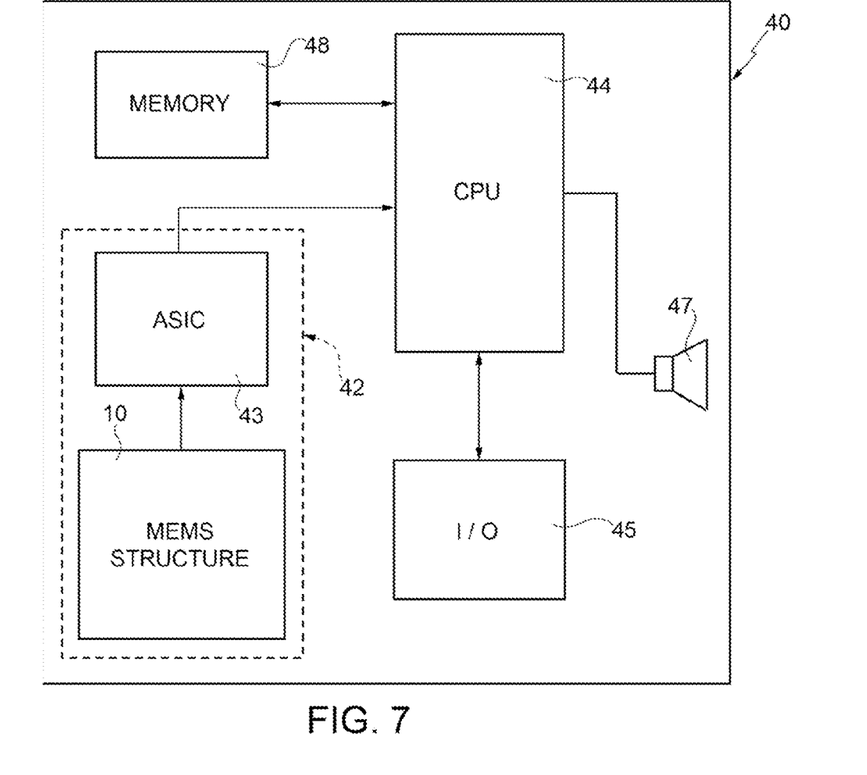

FIG. 7 shows use of the structure 10 and of the corresponding z-axis acceleration sensor in an electronic device 40. Here, a micro-electro-mechanical sensor 42 includes the MEMS structure 10 previously described and an ASIC (application-specific integrated circuit) 43, which forms the corresponding read interface, and can be provided in the same die with the MEMS structure 10 or in a different die, which can in any case be accommodated in a same package.

The electronic device 40 is preferably a portable mobile communication device, such as for example a cellphone, a PDA (Personal Digital Assistant), a portable computer, but also a digital audio player with voice-recording capacity, a photographic or video camera, a controller for videogames, etc., the electronic device 40 being generally able to process, store, and/or transmit and receive signals and information.

The electronic device 40 comprises a microprocessor 44, which receives the acceleration signals detected by the micro-electro-mechanical sensor 42, and an input/output interface 45, for example having a keyboard and a display, connected to the microprocessor 44. Furthermore, the electronic device 40 may comprise a speaker 47, for generating sounds on an audio output (not illustrated), and an internal memory 48.

Figure 8:
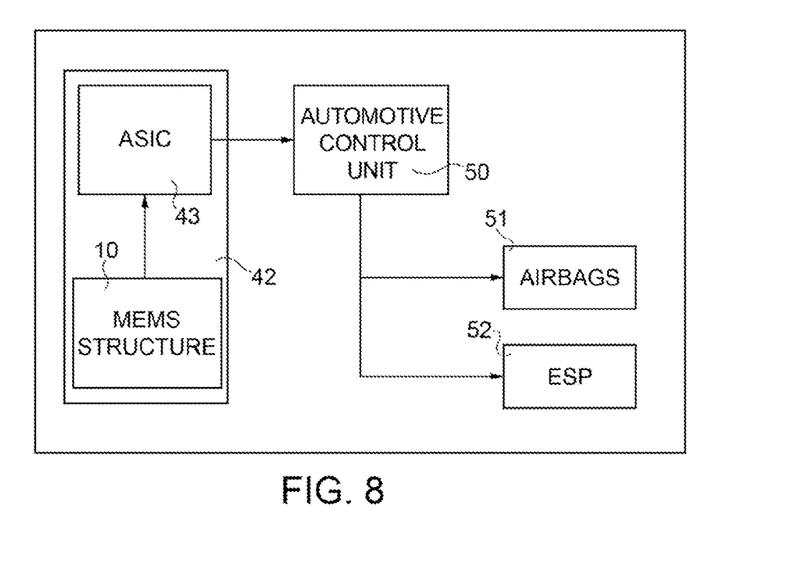

Alternatively, the structure 10 may be used for automotive applications, as illustrated in FIG. 8. In this application, as in FIG. 7, a micro-electro-mechanical sensor 42 includes the MEMS structure 10 previously described and an ASIC 43 that forms the corresponding read interface. The micro-electro-mechanical sensor 42 is here coupled to an automotive control unit 50 that uses the signals generated by the sensor 42, and specifically the detected z movement, in order to control an airbag-activation device 51 and an ESP (from the German Elektronisches Stabilitätsprogramm—electronic stability control) device 52.

Finally, it is clear that modifications and variations may be made to the MEMS detection structure described and illustrated herein, without thereby departing from the scope of the present disclosure.

For instance, the translating mass 14 could be circular or elliptical or in general rounded, instead of rectangular. In this case, also the supporting arms could have a complementary shape, for example an annular or elliptical shape. Furthermore, also the supporting masses could have a different shape, for example, they may have concave or convex sides, provided that they are symmetrical with respect to each other, irrespective of the shape of the translating mass 14, whether rectangular, cross-shaped, or rounded.

Furthermore, as illustrated above, even though the supporting arms 19a, 19b yield the advantages referred to above, the structure described herein may be obtained without these arms, although providing the increase in sensitivity discussed herein.

The translating mass 14 could have a position different from the one described, for example external to the anchorage elements 26 and/or have a different thickness from that of the tilting masses 15a, 15b.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micro-electro-mechanical detection structure, comprising:
    a substrate having a first surface in a plane;
    a first anchorage element and a second anchorage element projecting from and fixed with respect to the substrate;
    a translating mass suspended over the substrate and moveable in a first direction that is transverse to the plane;
    first and second elastic anchorage elements;
    a first tilting mass coupled to the first anchorage element by the first elastic anchorage element, the first tilting mass including a first supporting mass and a first supporting arm, the supporting mass facing a first side of the translating mass, the first supporting arm facing at least a second side of the translating mass, the first mass being configured to rotate with respect to a first axis;
    a second tilting mass coupled to the second anchorage element by the second elastic anchorage element, the second tilting mass including a second supporting mass and a second supporting arm, the second supporting mass facing a third side of the translating mass, the second supporting arm facing at least a fourth side of the translating mass, the second mass being configured to rotate with respect to a second axis, the first and second axes being substantially parallel to each other;
    a fixed electrode facing at a distance at least one of the first and second tilting masses and the translating mass; and
    elastic supporting elements elastically coupling the translating mass to the first and second tilting masses, respectively.

2. The structure according to claim 1, wherein the translating mass, the first and second tilting masses, and the elastic supporting elements are located about a central axis.

3. The structure according to claim 1, wherein the translating mass and the first and second tilting masses have surfaces that are coplanar with each other.

4. The structure according to claim 1, wherein the translating mass is arranged between the first and second anchorage elements.

5. The structure according to claim 1, wherein:
    the first supporting mass is coupled to the first anchorage element and the second supporting mass is coupled to the second anchorage element;
    the first supporting arm extends from the first supporting mass towards and around part of a periphery of the translating mass at the second side and the third side and the second supporting arm extends from the second supporting mass towards and around part of the periphery of the translating mass at the first side and fourth side; and
    the elastic supporting elements extend between the translating mass and the first and second supporting arms, respectively.

6. The structure according to claim 1, wherein the first supporting arm has a first portion extending from the first supporting mass towards the second supporting mass and a second portion extending between the translating mass and the second supporting mass, and the second supporting arm has a first portion extending from the second supporting mass towards the first supporting mass and a second portion extending between the translating mass and the first supporting mass.

7. The structure according to claim 6, wherein the translating mass has a rectangular shape, the first and second supporting masses have a rectangular shape, and the first and second supporting arms are substantially L-shaped.

8. The structure according to claim 1, wherein:
    the first and second supporting masses include first and second through openings, respectively;
    the first and second anchorage elements are located in the first and second through openings, respectively; and
    the first and second elastic anchorage elements are located in the first and second through openings, respectively, each of the first and second elastic anchorage elements being a pair of elastic anchorage elements that define the first and second axes, respectively.

9. The structure according to claim 1, wherein the fixed electrode is a first fixed electrode, the structure further comprising a second fixed electrode, the first and second electrodes located over the substrate and each facing the first and second tilting masses, respectively.

10. The structure according to claim 1, wherein the fixed electrode is a first fixed electrode, the structure further comprising a second fixed electrode and a cap located at a distance from and parallel to the first surface of the substrate, the translating mass and the first and second tilting masses being arranged between the substrate and the cap, wherein the first fixed electrode is located on the substrate and the second fixed electrode is located on the cap, the first and second fixed electrodes being mutually aligned in the first direction.

11. The structure according to claim 10, wherein the first and second fixed electrodes face the translating mass.

12. A micro-electro-mechanical sensor, comprising:
a MEMS detection structure that includes:
a substrate having a first surface in a plane;
a first anchorage element and a second anchorage element projecting from and fixed with respect to the substrate;
a translating mass suspended over the substrate and moveable in a first direction that is transverse to the plane;
first and second elastic anchorage elements;
a first tilting mass and a second tilting mass, the first tilting mass being coupled to the first anchorage element by the first elastic anchorage element, the second tilting mass being coupled to the second anchorage element by the second elastic anchorage element, the first mass being configured to rotate with respect to a first axis and the second mass being configured to rotate with respect to a second axis, the first and second axes being substantially parallel to each other, the first tilting mass including a first supporting mass and a first supporting arm, the second tilting mass including a second supporting mass and a second supporting arm, the first supporting mass coupled to the first anchorage element, the second supporting mass coupled to the second anchorage element, the first supporting arm extending from the first supporting mass towards and around part of a periphery of the translating mass, the second supporting arm extending from the second supporting mass towards and around part of the periphery of the translating mass;
a fixed electrode facing at a distance at least one of the first and second tilting masses and the translating mass; and
elastic supporting elements elastically coupling the translating mass to the first and second tilting masses, respectively, the elastic supporting elements extending between the translating mass and the first and second supporting arms, respectively; and
a read-interface circuit electrically coupled to the MEMS detection structure.

13. The sensor according to claim 12, wherein the MEMS detection structure and the read-interface circuit form a z-axis structure, and the MEMS detection structure is configured to detect an acceleration oriented in the first direction.

14. The sensor according to claim 12, wherein the read-interface circuit is an ASIC.

15. The sensor according to claim 12, wherein the translating mass and the first and second tilting masses each have a surface that is coplanar with each other and spaced apart from the first surface of the substrate.

16. The sensor according to claim 12, wherein the translating mass is arranged between the first and second anchorage elements.

17. An electronic device comprising:
a micro-electro-mechanical sensor including:
a MEMS detection structure that includes:
a substrate having a first surface in a first plane;
a first and second anchorage elements coupled to the substrate;
a translating mass suspended over the substrate and moveable in a first direction that is transverse to the plane;
elastic anchorage elements;
a first tilting mass coupled to the first anchorage element by one or more of the elastic anchorage elements, the first mass being configured to rotate with respect to a first axis, the first tilting mass including a first supporting mass and a first supporting arm, the first supporting mass extending along a first side of the translating mass, the first supporting arm extending along at least a second side of the translating mass;
a second tilting mass coupled to the second anchorage element by one or more of the elastic anchorage elements, the second mass being configured to rotate with respect to a second axis, the second tilting mass including a a second supporting mass and a second supporting arm, the second supporting mass extending along a third side of the translating mass, the second supporting arm extending along at least a fourth side of the translating mass, the first and second axes forming a second plane that is substantially parallel to the first plane;
fixed electrodes located on the first surface of the substrate and facing at a distance at least one of the first and second tilting masses and the translating mass; and
elastic supporting elements elastically coupling the translating mass to a respective one of the first and second tilting masses; and
a read-interface circuit electrically coupled to the MEMS detection structure; and
a microprocessor unit electrically coupled to the read-interface circuit.

18. The electronic device according to claim 17 wherein the electronic device is at least one of:
a cellphone;
a personal digital assistant;
a portable computer;
a digital audio player with voice-recording capacity;
a photographic camera or a video camera; and
a control device for videogames.

19. The electronic device according to claim 17 wherein the microprocessor unit is an automobile control unit, the electronic device further comprising:
an electronic stability-control device; and
an airbag-activation device.

20. The electronic device according to claim 17 wherein the first supporting mass, the first supporting arm, the second supporting mass, and the second supporting arm are substantially surrounding a perimeter of the translating mass.

21. The electronic device according to claim 17 wherein the first and second tilt masses together surround around a periphery of the translating mass.

22. The structure according to claim 1, wherein the first and second tilt masses together surround around a periphery of the translating mass.

\* \* \* \* \*